May 10, 1955     G. J. HUEBNER, JR     2,707,865
ROTOR SHAFT CONSTRUCTION
Filed June 2, 1950     2 Sheets-Sheet 1
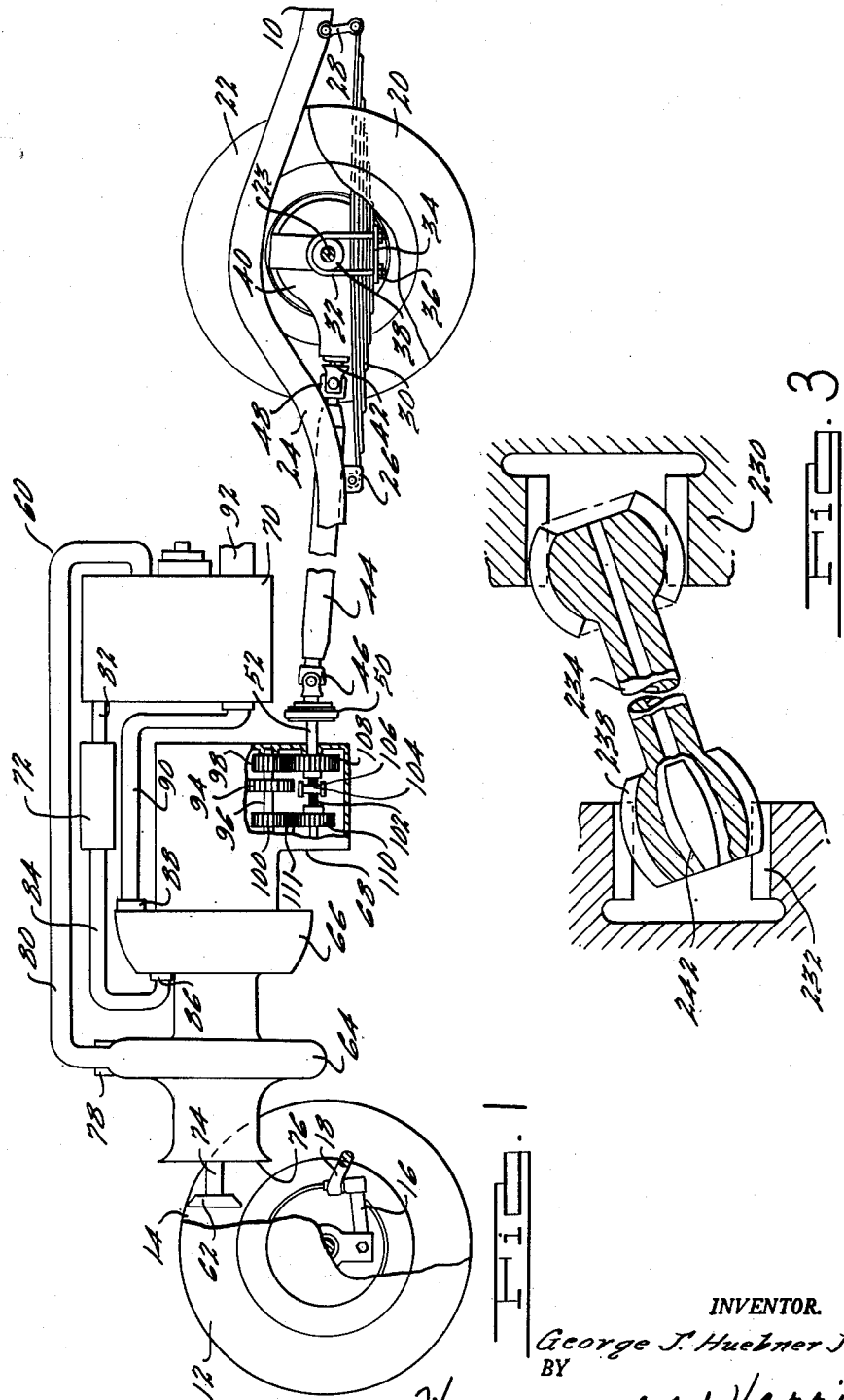
INVENTOR.
George J. Huebner Jr.
BY
Harness and Harris
ATTORNEYS.

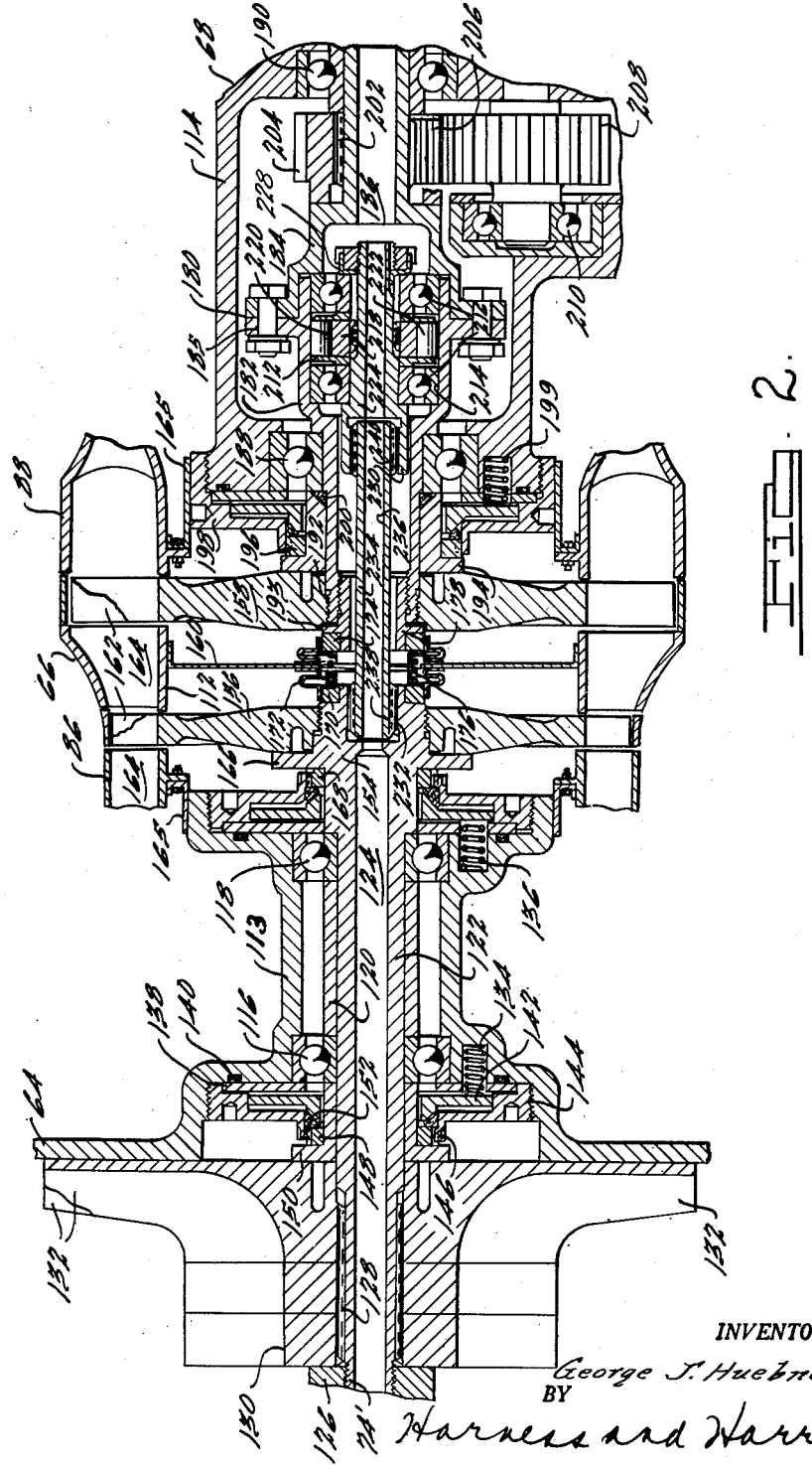

United States Patent Office 2,707,865
Patented May 10, 1955

2,707,865
ROTOR SHAFT CONSTRUCTION

George J. Huebner, Jr., Bloomfield Hills, Mich., assignor to Chrysler Corporation, Highland Park, Mich., a corporation of Delaware Application June 2, 1950, Serial No. 165,744

9 Claims. (Cl. 60—39.16)

This invention relates to rotor shaft construction and more particularly to a construction which includes a novel means for interconnecting shafting for two or more turbine rotors in a vehicle propulsion plant.

It is a known and accepted design practice to employ more than one turbine rotor in the propulsion power plant of a traction vehicle, for example. The compressor for the system is ordinarily continuously turbine driven whether the vehicle is in actual motion or not during all its phases of operation, whereas the vehicle driving mechanism, which includes a second stage turbine rotor, is normally in motion only when the vehicle is in motion. Separate sets of drive shafting may then be contemplated for the compressor and vehicle drive mechanism respectively, each set of shafting carrying one or more turbine rotors which are preferably mounted in the same general vicinity.

There are certain circumstances under which it has been found desirable to provide an effective drive between the aforesaid type sets of shafting, such drive at the same time being adapted to accommodate any inexact alignment of the shafting sets which may exist.

According to a feature of the present invention a torsion shaft of sufficient length to compensate for misalignment of its ends has been provided in an arrangement which permits the respective sets of drive shafting to remain in substantial juxtaposition and yet allow the same to be drivably connected through the torsion shaft. Therefore, no resort need be taken to the traditional flexible coupling devices, so-called, which may be found bulky and unsuited to high speed turbine work for reasons generally known.

According to a further feature of the invention, a torsion shaft is provided which, though permitting a drive relation to be established between two adjacent turbine rotors, does not take up unnecessary space in radial extent as would a flexible coupling device between the turbine rotors and yet which makes possible a short compact drive not ordinarily expected of either a torsion shaft or flexible coupling device.

According to still a further feature, provision is made to interpose a one-way friction device effective in the drive mechanism between the vehicle drive turbine and the compressor turbine to insure that the former turbine is burdened with the load of the compressor of the latter turbine whenever the vehicle drive turbine tends to overspeed in its relation to the compressor turbine.

According to yet a further feature, provision is made by means of a transverse partition and seal in radially spaced relationship with respect to the torsion coupling shaft to prevent motive fluid leakage between the respective stages of the turbine unit. Moreover, an additional provision thereof is to positively separate the lubricating fluid, which may be associated with the torsion shaft, from the motive fluid and dead fluid of the turbine stages. Either or both the separated fluids may then be under pressure without necessarily commingling.

According to another feature, a torsion shaft, a transverse partition and a seal are effectively employed between turbine rotors to accommodate considerable misalignment and motion due to differential thermal distortions of the rotors, rotor shafting, and transverse partitions.

Further features, objects, and advantages will either be specifically pointed out or will become apparent when for a better understanding of the invention reference is made to the following written description taken in conjunction with the accompanying drawings wherein:

Figure 1 is a longitudinal elevation of a vehicle to which the instant invention is shown applied;

Figure 2 is a longitudinal section of the propelling mechanism for the vehicle; and Figure 3 represents an exaggerated study of operation of drive transmitting parts of the propelling mechanism.

In Figure 1, a traction vehicle 10 is shown which may be of the automotive type. Vehicle 10 has front wheels 12 and 14 steerable as by a suitable knuckle 16 and tie rod 18, rear wheels 20 and 22 at the extremities of a drive axle 23, and a frame or body supporting structure 24 carried by the wheels. Frame 24 may be provided with a hanger 26 and spring shackle 28 between which is secured a load spring 30 which may be of the longitudinal leaf type. A spring clip 32 has its ends secured to a plate 34 by means of fasteners 36. Drive axle 23 is retained in an axle housing 38 which is received in spring clips 32 for connection to the load springs. Centrally of axle housing 38 is a differential 40 which may house a pinion carrier, not shown, driven by a drive shaft 42 and drive gear. The drive shaft 42 for the differential carries part of a universal joint 48 disposed at one end of a propeller shaft 44. At the other end of propeller shaft 44 is provided a universal joint 46 carried by the tail shaft 52 of transmission 68. The tail shaft 52 is provided with the usual hand brake drum 50 and flanges disposed thereadjacent. The propulsion power plant 60 for the vehicle may comprise an accessory 62, a compressor 64, a turbine 66, a transmission or gear case 68, a regenerator 70, and one or more burners 72. The accessory case 62, which may house a starter, generator means, a circulating fan and the like, is rotatably connected by a shaft 74 to the compressor 64. Shaft 74 extends through the scoop or mouth 76 for the compressor. Compressor 64, which may be of the centrifugal type, is provided with an outlet 78 connected by conduit 80 to regenerator 70. Compressed air from the compressor on being heated by the regenerator, is passed through a conduit 82, which connects with a burner 72. Conduit 84 may serve to connect burner 72 with inlet 86 for the turbine 66. A conduit 90 connects the turbine outlet 88 with regenerator 70 from which the ultimate exhaust gases are discharged through an exhaust pipe 92.

Turbine 66 drives a series of gears in the transmission including a gear 94 keyed to a countershaft 96. Mounted for rotation with countershaft 96 are gears 98 and 100. The tail shaft 52 in adjacency to countershaft 96 is provided with a splined portion 102 on which slides hub 104 carrying a shifter sleeve 106. Mounted for rotation relative to tail shaft 52 and supported thereby are gears 108 and 110. Shifter sleeve 106 carries teeth at its respective ends which are adapted to engage companion teeth on gears 108 and 110. As shifter sleeve 106 is moved to the left as viewed in Figure 1, it acts to clutch by toothed interengagement the gear 110 for rotation with tail shaft 52. Movement thereafter of shifter sleeve 106 to the right as viewed in Figure 1, results in gear 110 being de-clutched and gear 108 being clutched for rotation with tail shaft 52. Gears 98 and 108 are in continual mesh such that when the latter gear is clutched to the tail shaft 52, the tail shaft 52 and traction wheels are caused to rotate in a predetermined direction, for instance a direction corresponding to forward movement of the vehicle. Gears 100 and 110 are connected by an idler gear 111 to the end that when gear 110 is clutched for rotation with tail shaft 52, tail shaft 52 and the traction wheels 20 and 22 are rotated in a direction opposite to the direction just noted.

The operation of the device as described to the present point will now be set forth. By means of the accessory shaft 74 and the starter driving it, the compressor and the compressor turbine are cranked and then brought up to idling speed. Compressed air is delivered by compressor 64 through conduit 80 to the regenerator 70. In operation the regenerator 70 tends to store heat and impart this heat to the compressed air upon entry of the latter. The heated compressed air is led by conduit 82 from regenerator 70 to the burner 72. Fuel is burned in burner 72 to produce energy gases which are conducted to the inlet 86 of turbine 66. These energy gases are utilized to drive the turbine, at least one rotor of which drives compressor 64. The gases on leaving the turbine from discharge 88 are conducted through a conduit 90 into regenerator 70. The gases give up their heat to regenerator 70 and are then exhausted through the regenerator outlet 92. Turbine 66 drives the gears in the transmission 68 and, depending upon the position of shifter sleeve 106, causes torque to be applied to traction wheels 20 and 22 for either forward or reverse motion of the vehicle.

In Figure 2 the details of construction of the compressor 64, the turbine 66, and the gear case 68 are shown. The housing for these units has a common portion 113 for the compressor and turbine and provides also a turbine casing 112 and a gear case 114. In the common portion 113 of the housing just noted is received a span of bearings 116 and 118 separated by a spacer 120. Mounted for rotation in the bearing span is shafting 122 which is provided with a hollow 124. Shafting 122 is provided with an end portion 74' which is adapted for a drive connection on the accessory shaft 74 noted in connection with Figure 1. Adjacent portion 74' is a nut or retainer 126 and a set of splines 128. Rotatably carried by these splines 128 is a rotor 130 for the compressor 64 which may be of the radial flow type. Rotor 130 is provided with a plurality of radially disposed blades 132. In the common portion 113 of the housing are provided recesses for receiving a plurality of resilient members 134 and 136 which may be coil springs. Springs 134 and 136 constitute components of sealing assemblies which are employed adjacent different portions of shafting 122. For the sake of brevity, only the seal assembly associated with springs 134 will be described since it is similar to the seal assembly associated with springs 136. Springs 134, preferably three in number, each act through an opening provided in a plate 138 suitably sealed relative to the common portion 113 of the casing by a seal 140. Adjacent plate 138 is a floating plate 142 against which springs 134 act in a chamber defined by common portion 113 and a threaded cover 144.

Cover 144 is provided with an internally splined portion 146 in which is received a seal 148 which is held by the splines against rotation. Seal 148, which may contain powdered metal or ceramic, is preferably of a carbon composition which is found satisfactory. Being held against rotation, seal 148 acts as a rubbing seal and cooperates with a flanged member 150 mounted to rotate with shafting 122 and the rotor 130 for the compressor. A seal 152 against which a conical surface formed on floating plate 142 bears, is sealingly urged against the splines between the rubbing member 148 and the member 144.

Appropriately disposed seals, such as the seals 140 and 152 represented, serve to seal the chambers in and around the bearings and the floating plate against leakage and to provide an appropriate chamber for lubricant. Floating plate 142 provides a central bore through which both flanged member 150 and shafting 122 project in spaced non-interfering relation. Shafting 122 has an end 154 adjacent which are disposed turbine rotors 156 and 158 separated by a centrally apertured transverse member 160 which may be a partition. Rotor blades 162 carried by the rotors cooperate with stator blades 164 carried in the turbine casing to define a two-stage turbine.

Motive fluid enters the two-stage turbine through entry 86 and is discharged through the outlet 88. Casing 112 has end portions 165, one of which supports the nozzle vanes for the turbine. Turbine rotor 156 may be threadably received on the end 154 of shafting 122 and engages a flange 166. Rubbing seal 168, similar to seal 148 and held against rotation by splines cooperates with flange 166 in sliding engagement. A stepped portion of shaft end 154 receives another seal 170 which is held against rotation by a sylphon or bellows 172, the intermediate portion of which is mounted to partition 160 adjacent the central opening of the latter. The opposite end of bellows 172 holds a similar seal 174 against rotation. Acting between the rubbing seals 170 and 174 is a resilient member 176 which may be a coil spring. The bellows 172 is of flexible construction to provide for eccentricity and thermal expansion of the parts with which it is associated and may be formed of metal or a carbide. Rubbing seal 174 cooperates with a flanged portion 178 going to compose a section of shafting 180.

Shafting 180 has two parts 182 and 184 mutually connected by one or more fasteners 185. It will be observed that shafting 180 is hollow as indicated at 186. Shafting 180 is supported by a span of bearings 188 and 190 for rotation within gear case 68. At the end adjacent flanged portion 178 noted, shaft part 182 has a threaded portion 192 which carries a turbine rotor 158 locked with respect thereto by a retainer 193. The rotor 158 engages a flanged sleeve 194, which provides a sliding seal in cooperation with a seal 196. Seal 196 which may be of the composition noted for the previously described seals, has a splined engagement with a portion formed on a member 198 threadably held as a cover to close the end of casing 68. One or more springs 199 are received in gear case 68 to make effective the seal adjacent splined seal 196 in the manner similar to springs 134 and 136. A seal is provided at 200 effective between flanged sleeve 194 and bearing 188. At its other end, shafting 180 is provided with a set of splines 202 on which a gear 204 is mounted for rotation. Gear 204 constitutes one gear of a gear train including gear 206 and gear 208 through which drive is transmitted in the transmission. Gear 208 may have a bearing such as at 210 at either end.

Shafting 180 has an enlarged portion adjacent the connection of shaft part 182 and shaft part 184 adapted to receive an overrunning clutch 212. The inner walls of shaft part 182 constitute the outer member of the overrunning clutch and are formed to define a cylindrical chamber 214. Within the chamber are received sets of bearings 216 and an inner member 218 for the overrunning clutch 212. Inner member 218 is formed with recessed cam surfaces 220 along its periphery receiving friction elements 222 which may be rollers. Surfaces 220 cooperate with the rollers by well known camming principles to provide a one-way drive. A hollow shaft part 224 disposed within inner clutch member 218 is provided with splines for carrying the latter and is supported for rotation in bearings 216. Shaft part 224 has a nut 226 at one end and a lock 228 for holding the bearings and the inner assembly together as a unit. At its opposite end shaft part 224 is provided with a splined portion 230 bearing internal splines. Another set of internal splines 232 is formed on end 154 of shafting 122.

A quill shaft 234 having a hollow 236 is adapted to provide a torsion connection between the sets of internal splines 230 and 232 just noted. Shaft 234 will be noted to extend from the end of shafting 122 through the central opening of partition 160 in spacing to seal assembly 172, and thence into the hollow shafting section 180. Splines 238 and 240 at its extremities adapt torsion shaft 234 to connect splines 230 and 232 and may be splines of the so-called crown type but preferably are spherical-type splines as indicated in Figure 3.

In Figure 3 appears an exaggerated study of torsion shaft 234 in motion transmitting disposition. The teeth or splines 238 formed on shaft 234 will be observed to have spherical surfaces 242 so developed that torsion shaft 234 cannot only accommodate inexact alignment between the internal splines 230 and 232 but can also accommodate endwise movement between internal splines 230 and 232 such as may arise due to thermal distortion and expansion of structure. That is to say, splines 238 can move axially relative to internal splines 232, for instance, and can also transmit drive to and from internal splines 232 notwithstanding the fact that the axis of torsion shaft 234 is not coincident with the axis of the internal splines 232. It will be appreciated, of course, that for a torsion shaft of suitable length to connect turbine rotors to be provided as is ordinarily contemplated, there would be a necessity for the turbine rotors to have a considerable spacing between them. In the instant arrangement of Figure 2, however, torsion shaft 234 compactly passes through the rotor 158 and yet provides a driving connection between rotor 156 and rotor 158. Torsion shaft 234, as will be apparent, is of sufficient length to accommodate inexact alignment between the axes of rotation of rotors 156 and 158.

The splines 230 and 240 will be observed to be in substantial transverse alignment with bearings 188 of the bearing span for shafting 180. Accordingly, there will be little tendency for eccentricity and wobble as between the ends of torsion shaft 234 even though it is in a semi-floated disposition. The sylphon 172 is effective also to provide for inexact alignment between turbine rotors 156 and 158 as well as for thermal distortion and change in the spacing between the said rotors.

The overall operation of the mechanism of Figures 1 through 3 is as follows. Compressor rotor 130 is rotated by starter or other suitable means to bring the shafting 122 up to a suitable speed beyond which the turbine apparatus can properly perform to keep the shafting 122 in rotation. Compressor blades 132 will compress the air and, subsequent to conversion of the air into motive fluid, motive fluid is passed through the two stages of the turbine and is discharged through the turbine exhaust outlet 88. The rotor 156 is driven by the motive fluid and in turn drives the compressor. Turbine rotor 158 in the meantime may be allowed to remain stationary as permitted by overrunning clutch 212, the cams and friction elements 222 of the latter being arranged to the end that turbine rotor 156 may rotate freely of turbine rotor 158.

By operator controlled means, not shown, the turbine combustion processes may be accelerated in order that the motive fluid will give impetus to turbine rotor 158, the blades of which are adapted for rotation in the same direction as rotor 156. Owing to the connection between turbine rotor 158 and the traction wheels of the vehicle through gear case 68 and propeller shaft 44, when rotor 158 begins to move, the traction wheels 20, 22 respond. As the force of the motive fluid on turbine rotor 158 becomes more pronounced, the sustained efforts will bring rotor 158 and wheels 20, 22 up to the operating speed desirable. Overrunning clutch 212 is so arranged as to prevent turbine rotor 158 from overspeed in its relation to turbine rotor 156. When turbine rotor 158 attempts to overspeed, the friction elements 222 of the overrunning clutch engage and through the mechanism provided serve to load rotor 158 with the load of the compressor rotor 130.

The presence of the overrunning device 212 is of benefit for many readily perceivable reasons. Device 212 will provide for engine braking on down hill grades and for other circumstances. Moreover, the overrunning device 212 will permit a towed start of the vehicle as under the circumstances where the starter is inadequate to commence operation of the turbine. Again if the vehicle drive mechanism between rotor 158 and the traction wheels is interrupted as, for instance by shifter sleeve 106 being shifted to neutral or otherwise being made unavailing, the device 212 will engage to prevent there resulting an unloaded runaway of rotor 158.

It is to be noted that the hollow portions 124 and 186 of the shafting may communicate with one another as by means of the hollow 236 and the hollow shaft portion 224. A through circulating system of pressure lubrication, therefore, is made feasible for continuously lubricating splines 238 and 240 and bearings 216 and the overrunning clutch components. Lubricating passages for the remainder of the bearings 116, 118, 188, and 190 as well as for the rubbing seals if desirable, are also formed in the structure instantly disclosed and it may be found convenient to serve all lubricating passages from a common source.

Variations within the spirit and scope of the above described invention are equally comprehended by the foregoing description.

I claim:

1. In a turbine of the multistage type staging having a casing, a transverse partition in said casing having means forming a central opening therethrough, blade carriers on opposite sides of the partition, first and second shafts extending in said casing toward the partition and supporting the blade carriers for rotation in said casing, each said shaft having an end in spaced relation adjacent said partition central opening means, and on opposite sides in substantial registry therewith, a quill-shaft extending through said central opening means having first and second means at the respective ends thereof effective to provide driving connection with the first and second shafts, each of said first and second means providing at least a one-way coupling connection, and a sealing device sealingly mounted to said central opening means in surrounding relation to said quill-shaft and having end portions slideably engaging the respective said ends of the first and second shafts in sealing relation.

2. In a turbine of the multistage type staging having a casing, a transverse partition in said casing having means forming a central opening therethrough, blade carriers on opposite sides of the partition, first and second shafts extending in said casing toward the partition and supporting the blade carriers for rotation in said casing, each said shaft having an end in spaced relation adjacent said partition central opening means, and on opposite sides in substantial registry therewith, a quill-shaft extending through said central opening means having first and second means at the respective ends thereof effective to provide driving connection with the first and second shafts, each of said first and second means providing at least a one-way coupling connection, and a sealing device sealingly mounted to said central opening means in surrounding relation to said quill-shaft and having end portions slideably engaging the respective said ends of the first and second shafts in sealing relation, and a resilient element acting directly between said end portions to bias the latter against the said ends of the first and second shafts.

3. In a rotary power conversion machine, a casing, a section of hollow shafting having end portions and being open at least at one end thereof, means journalling the end portions of said shafting section in said casing, a pair of elements drivingly connected to said shafting section at spaced locations thereon for transmitting drive to one another through said shafting section, a certain element of said pair being mounted to said open end portion of the shafting section, a part journalled internally of said section of hollow shafting at a spaced axial location to said open end for independent rotation relative to said section and casing, means mounted in said casing substantially coaxially to said shafting section for independent rotation relative thereto, and including a part in spaced adjacency to said open end portion of the shafting section, a member disposed longitudinally in said open end of the hollow shafting section adjacent said certain element, and having the respective ends thereof extending toward each of the aforesaid two parts, and means operatively providing a rotatable-drive joint between said respective ends of the member and said two parts such as to accommodate axial misalignment of the latter relative to each other and to said member, and friction elements operatively disposed between said first-named part and said section of hollow shafting and engageable for providing a non-return drive from the elements of said pair through said shafting section to said parts.

4. In a rotary power conversion machine, a casing, a section of hollow shafting having end portions and being open at least at one of the ends thereof, means journalling the end portions of said shafting section in said casing, a pair of elements drivingly connected to said shafting section at spaced locations thereon for transmitting drive to one another through said shafting section, a certain element of said pair constituting a turbine blade carrier and being mounted to said open end portion of the shafting section, a part journalled internally of said section of hollow shafting at a spaced axial location to said open end and said journalling means for independent rotation relative to said section and casing, means mounted in said casing substantially coaxially to said shafting section for independent rotation thereto, and including a part in spaced adjacency to said open end portion of the shafting section, a quill-shaft member disposed longitudinally in said open end of the hollow shafting section adjacent said certain element, and having the respective ends thereof extending toward each of the aforesaid two parts, and means operatively providing a rotatable-drive joint between said respective ends of the member and said two parts such as to accommodate axial misalignment of the latter relative to each other and to said member, and one-way friction roller elements operatively disposed between said first-named part and said section of hollow shafting and engageable for providing a non-return drive from the elements of said pair through said shafting section to said parts.

5. In a vehicle, a prime mover having a casing, a transverse partition in said casing having means forming a central opening therethrough, first and second turbine members on opposite sides of the partition, first and second shafts extending in said casing toward the partition and respectively supporting said first and second turbine members for rotation in said casing, each said shaft having an end in closely spaced proximity to said partition central openings means and in closely spaced proximity to one another on opposite sides of said central opening means and in substantial registry therewith, means including a compressor for the prime mover connected to the first shaft so as to be drivable by the first turbine member, means forming a connection to each of said shafts and engageable for drivingly connecting the second turbine member and the first turbine member, said connection forming means including a quill-shaft extending through said central opening means, and a sealing device sealingly mounted to said central opening means in surrounding relation to the quill-shaft and having end portions slidably engaging the respective said closely spaced proximate ends of the first and second shafts in sealing relation.

6. In a vehicle, a prime mover having a casing, a transverse partition in said casing having means forming a central opening therethrough, first and second turbine members on opposite sides of the partition, first and second shafts extending in said casing toward the partition and respectively supporting said first and second turbine members for rotation in said casing, each said shaft having an end in closely spaced proximity to said partition central opening means and in closely spaced proximity to one another on opposite sides of said central opening means and in substantial registry with the latter, said second shaft being hollow and open-ended at the just-named end thereof, and said first shaft having a tooth-supporting part adjacent the just-named end thereof, a tooth-supporting part journalled internally of the hollow of said second shaft at a spaced axial location to said second shaft open end for independent rotation relative to said second shaft and said casing, a quill-shaft member disposed in said partition central opening means and protruding longitudinally into said open end of the hollow second shaft, and having the respective ends thereof extending toward each of the aforesaid two tooth-supporting parts, sets of teeth operatively providing a rotatable-drive joint between said respective ends of the member and said two parts such as to accommodate axial misalignment of the latter relative to each other and to said member, friction elements operatively disposed between said second-named part and said hollow second shaft and disengageably engageable for providing a non-return drive from said second shaft through said parts and said quill-shaft member to said first turbine member, and a sealing device sealingly mounted to said central opening means in surrounding relation to the quill-shaft and having end portions slidably engaging the respective said closely spaced proximate ends of the first and second shafts in sealing relation.

7. In a turbine of the multistage type, a first blade carrier for one of said stages, a second blade carrier for another of said stages, a common casing surrounding said blade carrier, a pair of supporting shaft means, each of said shaft means being individually secured to separate ones of said blade carriers, means for rotatably mounting each of said supporting shaft means in separate portions of said casing, said first and second blade carriers being coaxially disposed in proximate spaced relationship, the supporting shaft means for the respective blade carriers extending axially in opposite directions from the space between said blade carriers, and coupling means for interconnecting said supporting shaft means including a coupling shaft axially disposed between said pair of supporting shaft means for providing a compensation for error in the alignment of the supporting shaft means, said coupling shaft being directly connected at one end thereof with one of said shaft means, and a one-way clutch means for connecting the other end of said coupling shaft with the other shaft means, said one-way clutch means being effective to permit relative rotation of said blade carriers in one direction only.

8. In a turbine assembly having multiple turbine stages, a first blade carrier for one of said stages, a second blade carrier for another of said stages, a common casing for said blade carriers, separate shaft means for individually supporting each of said blade carriers for rotation in the casing in substantially coaxial closely spaced adjacency, coupling means for drivably connecting each of said shaft means including two sets of spline teeth disposed in substantial coaxial relationship with respect to said blade carriers and overlapping the space between said adjacent blade carriers and extending laterally to one side thereof, a quill-shaft drivably connecting said sets of spline-teeth, said quill-shaft being splined at either end thereof to complement and to engage said sets of spline teeth so as to compensate for error in alignment of said blade carriers in transmitting torque therebetween, said coupling means including clutch structure providing for at least a one-way coupling connection between said blade carriers to prevent overspeeding of one blade carrier with respect to the other.

9. In a turbine assembly having multiple turbine stages, a first blade carrier for one of said stages, a second blade carrier for another of said stages, a common casing for said blade carrier, separate shaft means for individually supporting each of said blade carriers for rotation in the casing in substantially coaxial closely spaced adjacency, coupling means for drivably connecting each of said shaft means including two sets of spline-teeth disposed in substantial coaxial relationship with respect to said blade carriers and overlapping the space between said adjacent blade carriers and extending laterally to one side thereof, a quill-shaft drivably connecting said sets of spline-teeth, said quill-shaft having spherically formed ends with external spline teeth adapted to complement and to engage said sets of spline teeth so as to compensate for error in alignment of said blade carriers in transmitting torque therebetween, said coupling including clutch structure providing for at least a one-way coupling connection between said blade carriers to prevent overspeeding of one blade carrier with respect to the other.

References Cited in the file of this patent

UNITED STATES PATENTS

| | | |
|---|---|---|
| 1,341,273 | Ljungström | May 25, 1920 |
| 2,095,991 | Lysholm | Oct. 19, 1937 |
| 2,136,947 | Morgan | Nov. 15, 1938 |
| 2,275,543 | Meyer | Mar. 10, 1942 |
| 2,282,894 | Sheldon | May 12, 1942 |
| 2,380,113 | Kuhns | July 10, 1945 |
| 2,554,593 | Sédille | May 29, 1951 |
| 2,587,057 | McVeigh | Feb. 26, 1952 |
| 2,591,540 | Grylls | Apr. 1, 1952 |
| 2,619,797 | Haworth | Dec. 3, 1952 |
| 2,625,006 | Lundquist | Jan. 13, 1953 |

FOREIGN PATENTS

| | | |
|---|---|---|
| 617,856 | Great Britain | Feb. 11, 1949 |
| | (Corresponds to U. S. #2,591,540) | |
| 378,660 | Italy | Feb. 20, 1940 |